United States Patent
Aizawa

(10) Patent No.: US 10,491,830 B2
(45) Date of Patent: Nov. 26, 2019

(54) INFORMATION PROCESSING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Michio Aizawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 46 days.

(21) Appl. No.: 15/830,630

(22) Filed: Dec. 4, 2017

(65) Prior Publication Data
US 2018/0160049 A1    Jun. 7, 2018

(30) Foreign Application Priority Data
Dec. 6, 2016 (JP) ................. 2016-237090

(51) Int. Cl.
*H04N 5/232* (2006.01)
*H04N 5/247* (2006.01)
*H04N 5/222* (2006.01)

(52) U.S. Cl.
CPC ....... *H04N 5/23296* (2013.01); *H04N 5/2224* (2013.01); *H04N 5/23206* (2013.01); *H04N 5/247* (2013.01)

(58) Field of Classification Search
CPC ............. H04N 5/23296; H04N 5/2224; H04N 5/23206; H04N 5/247
See application file for complete search history.

(56) References Cited

U.S. PATENT DOCUMENTS

| | | | |
|---|---|---|---|
| 9,521,234 B2 | 12/2016 | Aizawa et al. | |
| 2005/0018045 A1* | 1/2005 | Thomas | G06K 9/209 348/157 |
| 2012/0057852 A1* | 3/2012 | Devleeschouwer | G11B 27/034 386/278 |

(Continued)

FOREIGN PATENT DOCUMENTS

| | | |
|---|---|---|
| JP | 2008-068060 A | 3/2008 |
| JP | 2015187797 A | 10/2015 |

OTHER PUBLICATIONS

Japanese Office Action for application No. 2016237090 dated Dec. 21, 2018 with English translation (6 pages).

(Continued)

*Primary Examiner* — Mekonnen D Dagnew
(74) *Attorney, Agent, or Firm* — Carter, DeLuca & Farrell LLP

(57) ABSTRACT

An information processing apparatus receives input operation information by an operation unit configured to successively perform a moving operation for a position and/or orientation of a virtual viewpoint for generating a virtual-viewpoint image, switches the virtual viewpoint to another virtual viewpoint located at a position spatially separated from a position of the virtual viewpoint and having an image-capturing space common to the virtual viewpoint, and determines, if the virtual viewpoint is switched, a motion of the other virtual viewpoint after the switching in accordance with a motion of the virtual viewpoint based on the operation information before the switching.

12 Claims, 12 Drawing Sheets

(56) References Cited

U.S. PATENT DOCUMENTS

2016/0127692 A1* 5/2016 Yoneji .................... G06T 7/292
  348/159
2018/0229656 A1* 8/2018 Yokota .................... B60R 1/00

OTHER PUBLICATIONS

Fang, et al., 3D Free-viewpoint Viewing Interface with Virtual Viewpoint Migration to Character in the Scene, IEICE Technical Report, The Institute of Electronics, Information and Communication Engineers, 2015, vol. 114, No. 487, p. 27-32.

* cited by examiner

F I G. 7A
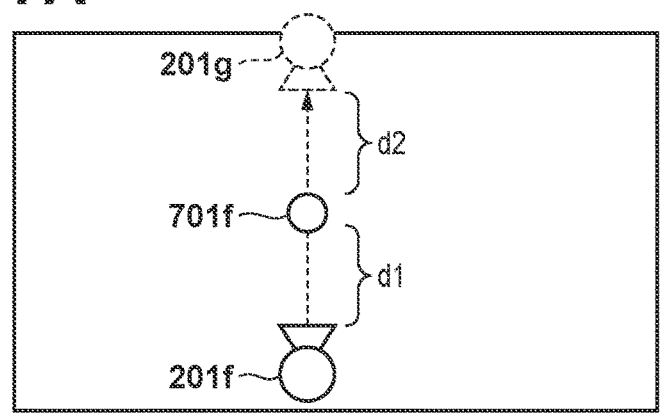
F I G. 7B
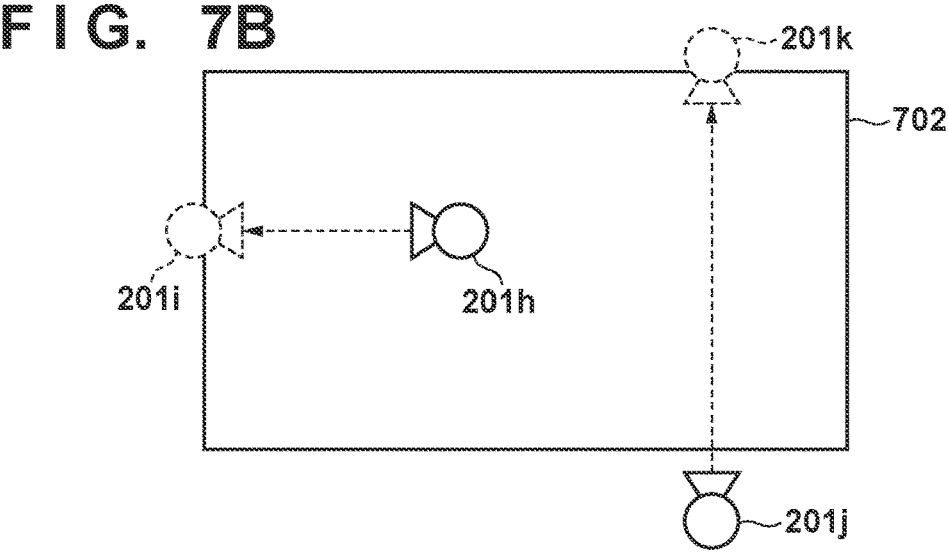
F I G. 7C
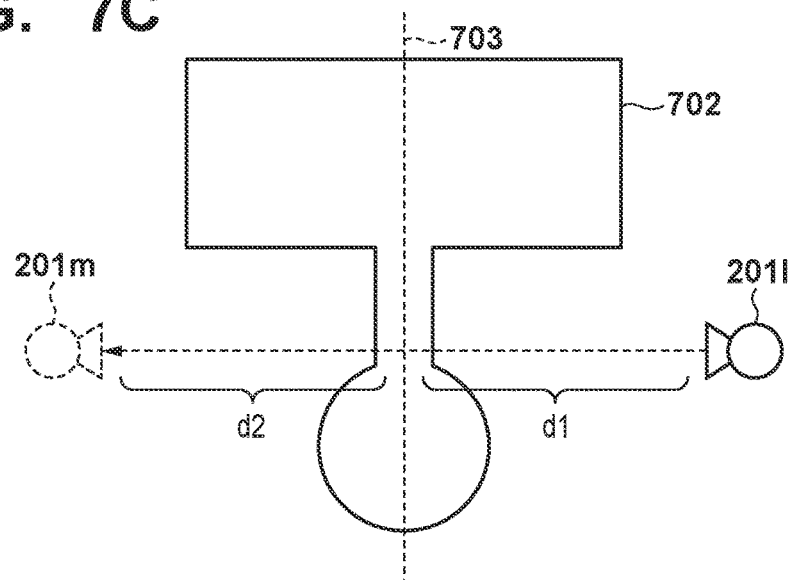

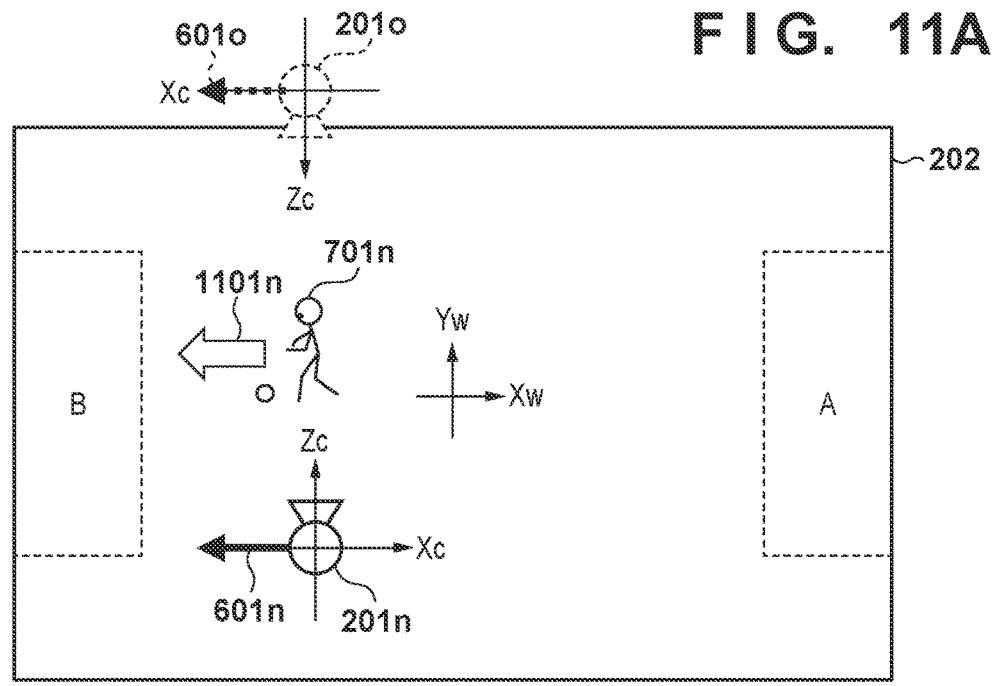
FIG. 11A
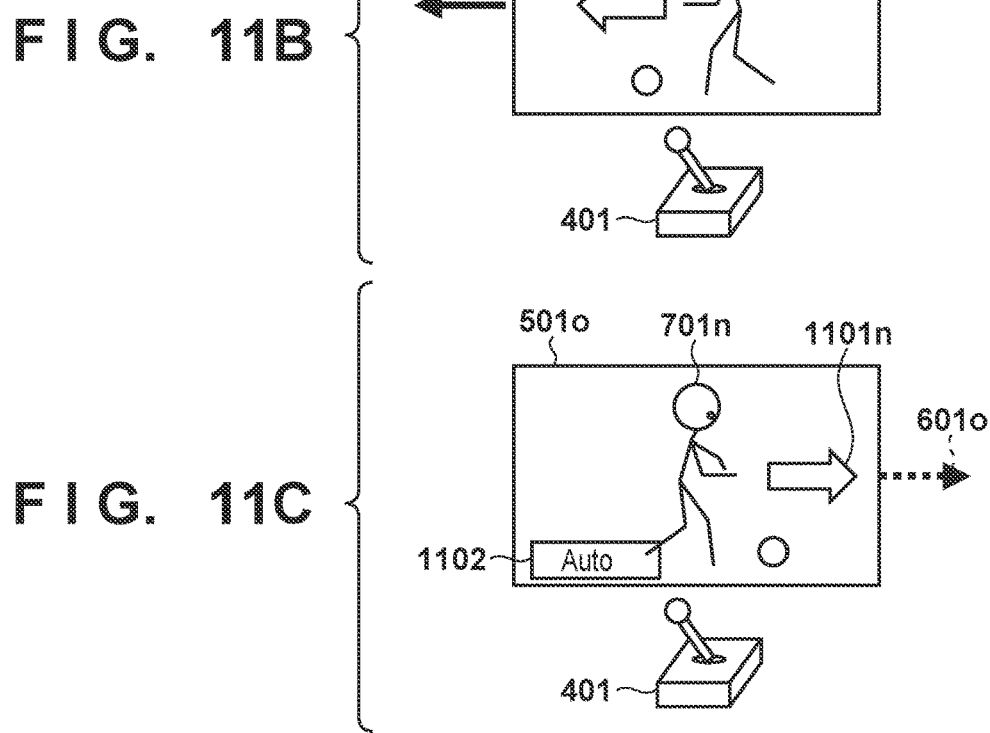
FIG. 11B
FIG. 11C

US 10,491,830 B2

INFORMATION PROCESSING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to an information processing apparatus for designating a virtual viewpoint by operating a virtual camera, a control method therefor, and a non-transitory computer-readable storage medium.

Description of the Related Art

In recent years, a technique of performing a multi-viewpoint synchronous image capturing operation by installing a plurality of cameras at different positions, and generating a virtual-viewpoint image using a plurality of viewpoint images obtained by the image capturing operation is attracting attention. In the technique of generating a virtual-viewpoint image from a plurality of viewpoint images, it is possible to browse a highlight scene of soccer, basketball, or the like from various angles, and provide the user a greater sense of presence, as compared with a normal image. As a method of designating a virtual viewpoint for generating a virtual-viewpoint image, there is provided a method using a virtual camera. Japanese Patent Laid-Open No. 2008-68060 describes a technique in which an operator designates a virtual viewpoint by operating a virtual camera with reference to a virtual-viewpoint image viewed from the virtual camera.

In the technique described in Japanese Patent Laid-Open No. 2008-68060, for example, if the current virtual camera is switched to another virtual camera which faces in the opposite direction (for example, on the opposite side with respect to an object), the right and left sides of a virtual-viewpoint image viewed from the operator are reversed. It takes time for the operator to grasp the position and direction of a new virtual-viewpoint image after switching, and the operation of the virtual camera immediately after switching is unwantedly delayed. This poses a problem that it may be difficult to implement a smooth camera work before and after switching the virtual camera.

SUMMARY OF THE INVENTION

The present invention has been made in consideration of the above problem.

According to one aspect of the present invention, there is provided an information processing apparatus which comprises: an input unit configured to receive operation information by an operation unit configured to successively perform a moving operation for a position and/or orientation of a virtual viewpoint for generating a virtual-viewpoint image; a switching unit configured to switch the virtual viewpoint to another virtual viewpoint located at a position spatially separated from a position of the virtual viewpoint and having an image-capturing space common to the virtual viewpoint; and a determination unit configured to determine, if the switching unit switches the virtual viewpoint, a motion of the other virtual viewpoint after the switching in accordance with a motion of the virtual viewpoint based on the operation information before the switching.

Further features of the present invention will become apparent from the following description of exemplary embodiments (with reference to the attached drawings).

BRIEF DESCRIPTION OF THE DRAWINGS

FIGS. 7A to 7C are views for explaining the position and orientation of the virtual camera 201 before and after switching;

FIGS. 11A to 11C are views for explaining a practical example of the switching operation of the virtual camera 201;

DESCRIPTION OF THE EMBODIMENTS

Embodiments of the present invention will be described in detail below with reference to the accompanying drawings. Note that the embodiments to be described below are merely examples when the present invention is practiced concretely, and the present invention is not limited to them.

[First Embodiment]

Figure 1:
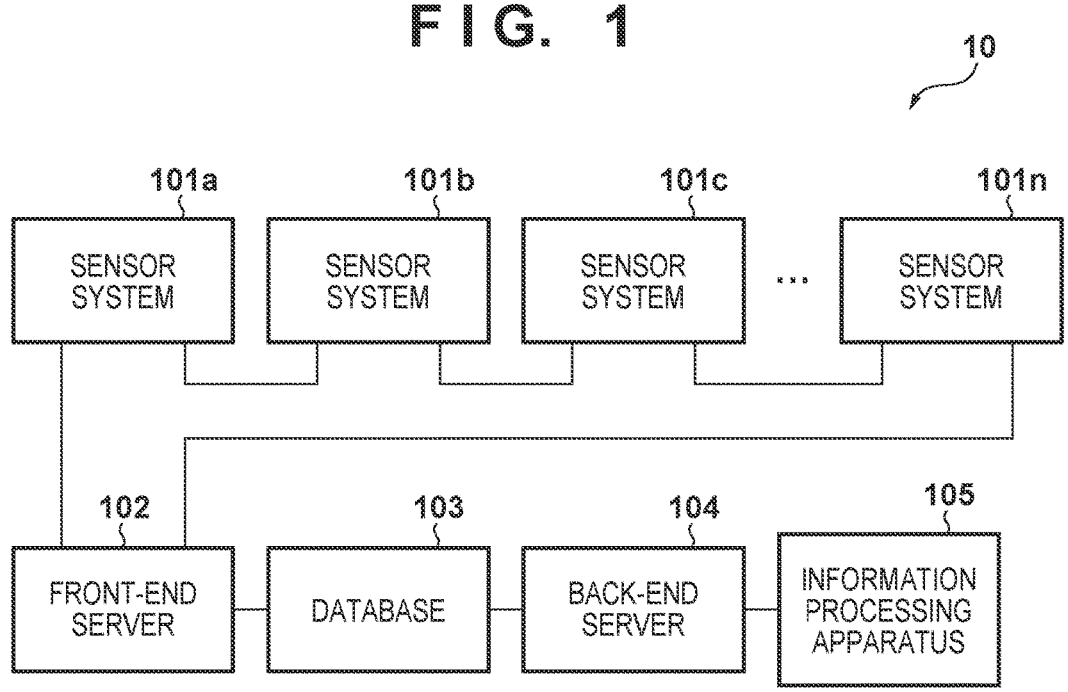
FIG. 1 is a schematic block diagram showing a virtual-viewpoint image generating system according to an embodiment.

FIG. 1 is a schematic block diagram showing a virtual-viewpoint image generating system 10 according to this embodiment. The virtual-viewpoint image generating system 10 includes N sensor systems 101a, 101b, 101c, . . . , 101n, a front-end server 102, a database 103, a back-end server 104, and an information processing apparatus 105. Each of the N sensor systems 101 includes a camera and a microphone. The cameras of the N sensor systems 101 generate image data by capturing images in synchronism with each other. The microphones of the N sensor systems 101 generate sound data by collecting sounds in synchronism with each other.

The front-end server 102 obtains the image data and sound data from the N sensor systems 101, and writes them in the database 103. The information processing apparatus 105 accepts an operation of an operator, designates a virtual viewpoint of a virtual camera 201 (to be described later) based on the operation, and outputs information about the virtual viewpoint to the back-end server. The back-end server 104 accepts the information about the virtual viewpoint from the information processing apparatus 105, reads out the image data and sound data corresponding to the information from the database 103, and performs rendering processing, thereby generating virtual-viewpoint image data and virtual-viewpoint sound data. The back-end server 104 outputs the generated virtual-viewpoint image data and virtual-viewpoint sound data to the information processing apparatus 105. The information processing apparatus 105 displays the received virtual-viewpoint image data and virtual-viewpoint sound data to the operator.

Figure 2:
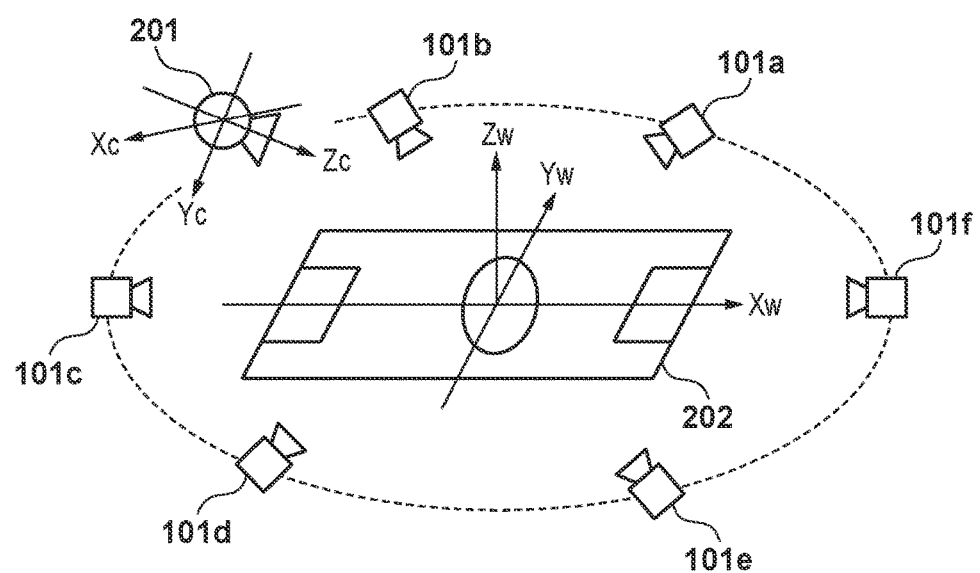
FIG. 2 is a view for explaining a virtual camera 201 in an image-capturing space.

FIG. 2 is a view for explaining the positional relationship between the N (N=6) sensor systems 101 and the virtual camera 201. Referring to FIG. 2, the six sensor systems 101*a* to 101*f* are arranged around an image-capturing space (for example, a stadium), and the virtual camera 201 is arranged in an arbitrary space. For example, the six sensor systems 101*a* to 101*f* are arranged to face a field 202. The virtual camera 201 is a virtual camera capable of performing image capturing at a viewpoint different from those of the cameras of all the sensor systems 101*a* to 101*f*.

In this embodiment, to uniquely determine the position of the image-capturing section of the virtual camera 201 regardless of the display state of a captured image, a world coordinate system (X-, Y-, and Z-axes) is defined as follows. That is, the center of the field 202 is set as the origin, the long-side direction of the field is set as the X-axis, the short-side direction of the field is set as the Y-axis, and a direction vertical to the X- and Y-axes is set as the Z-axis. The X-, Y-, and Z-axes of the world coordinate system are represented by Xw, Yw, and Zw, respectively, and the directions of the arrows of the Xw-, Yw-, and Zw-axes shown in FIG. 2 each indicate the positive direction.

In this embodiment, to determine a direction when viewed from the virtual camera 201, a virtual camera coordinate system is defined as follows. That is, the optical center of the virtual camera 201 is set as the origin, the optical-axis direction is set as a Z-axis, the lateral direction (horizontal direction) of the virtual camera 201 is set as an X-axis, and the longitudinal direction (vertical direction) of the virtual camera 201 is set as a Y-axis. The X-, Y-, and Z-axes of the virtual camera coordinate system are represented by Xc, Yc, and Zc, respectively, and the directions of the arrows of the Xc-, Yc-, and Zc-axes shown in FIG. 2 each indicate the positive direction.

Note that the above-described definitions of the world coordinate system and virtual camera coordinate system are merely examples, and these coordinate systems may be defined by other methods.

Figure 3:
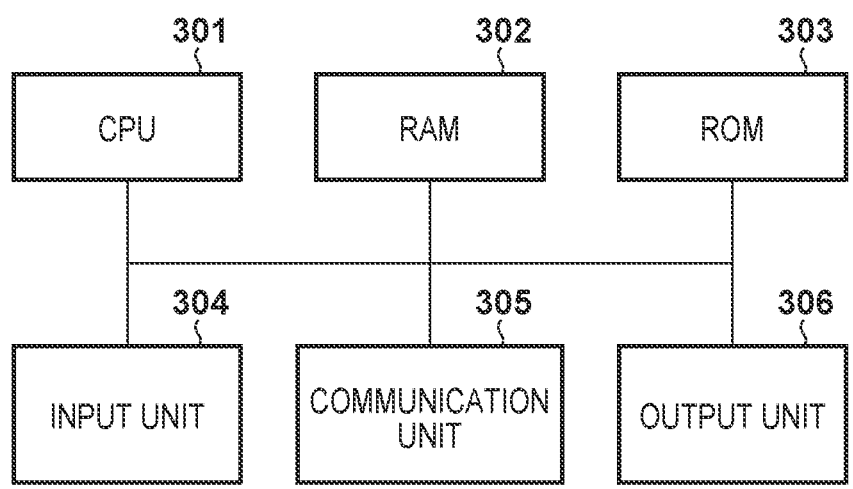
FIG. 3 is a block diagram showing examples of the hardware components of an information processing apparatus 105.
Figure 4:
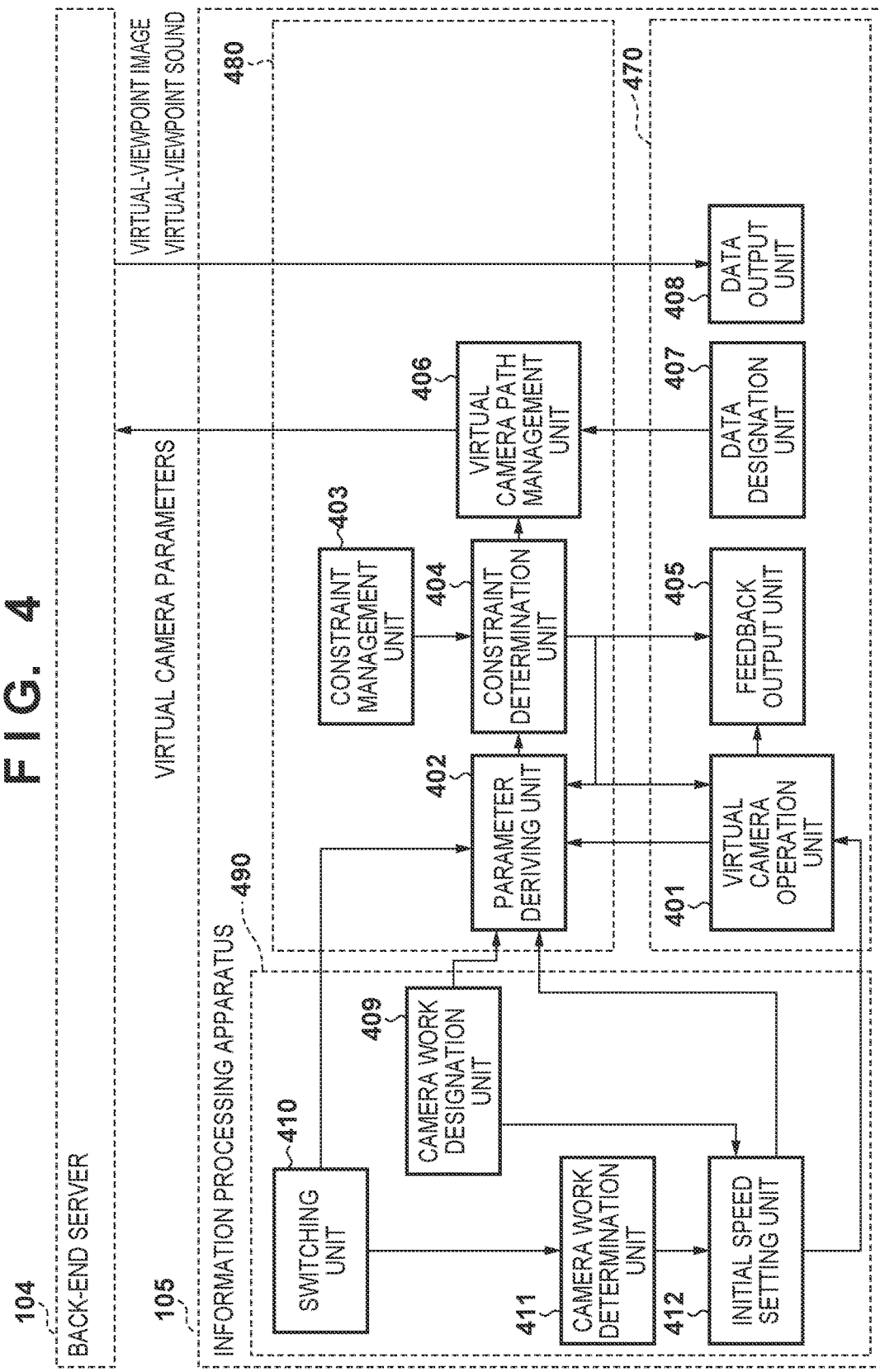
FIG. 4 is a block diagram showing examples of the functional components of the information processing apparatus 105.

The arrangement of the information processing apparatus 105 according to this embodiment will be described next with reference to FIGS. 3 and 4. FIG. 3 is a block diagram showing examples of the hardware components of the information processing apparatus 105. FIG. 4 is a block diagram showing examples of the functional components of the information processing apparatus 105.

The hardware components of the information processing apparatus 105 will be described first with reference to FIG. 3. A CPU (Central Processing Unit) 301 performs predetermined processing using a computer program and data stored in a RAM (Random Access Memory) 302 or a ROM (Read Only Memory) 303. Thus, the CPU 301 controls the overall operation of the information processing apparatus 105 and executes various processes (to be described later). The RAM 302 includes a work area to temporarily store a computer program and data loaded from the ROM 303. The RAM 302 also includes a work area to be used by the CPU 301 to execute various processes. The ROM 303 holds computer programs and data.

An input unit 304 includes input devices such as a joy stick, jog dial, touch panel, keyboard, and mouse, and accepts the operation of the operator (user) to input operation information to the information processing apparatus 105. The above-described various input devices (operation devices) may be incorporated in the information processing apparatus 105 or externally attached to the information processing apparatus 105. A communication unit 305 transmits/receives information to/from the back-end server 104 via, for example, a LAN (Local Area Network). An output unit 306 includes a display and a loudspeaker, and outputs various kinds of information necessary for the operation of the operator.

The functional components of the information processing apparatus 105 will be described next with reference to FIG. 4. The information processing apparatus 105 includes, as the functional components, an operation UI unit 470, a virtual camera management unit 480, and an extended function processing unit 490. These components may be mounted on the same apparatus, or separately mounted on an apparatus serving as a server and an apparatus serving as a client. Alternatively, for example, the virtual camera management unit 480 may be mounted on a Web server and the operation UI unit 470 and the extended function processing unit 490 may be mounted on a Web browser, thereby implementing the same functions.

A virtual camera operation unit 401 accepts an operation for successively performing, in accordance with the operation of the operator, a moving operation for the position and/or orientation of a viewpoint (virtual viewpoint) for generating a virtual-viewpoint image by the virtual camera 201. In other words, the virtual camera operation unit 401 inputs, via the input unit 304, operation information indicating the operation of the operator for determining a virtual viewpoint. With the operation of the operator, a change (movement) of the position of the virtual camera 201, a change (rotation) of the orientation of the virtual camera 201, a change of the zoom magnification of the virtual camera 201, and the like are accepted. The correspondence between the operation for the input unit 304 and the operation (motion) of the virtual camera 201 may be determined in advance. For example, if the input unit 304 receives operation information via the joy stick, the operation of the operator for tilting the joy stick leftward is associated with the leftward movement (in the negative direction of the Xc-axis) of the virtual camera 201. If the input unit 304 receives operation information via the touch panel, the operator may designate the trajectory of the virtual camera 201. For example, the operator touches the touch pad to draw a circle, thereby designating a trajectory when the virtual camera 201 rotates on a circumference around a goal post. In this case, the virtual camera 201 can move around the goal post along the designated trajectory. At this time, the operator may designate the orientation of the virtual camera 201 so that the virtual camera 201 always faces the goal post.

A parameter deriving unit 402 derives virtual camera parameters representing the position, orientation, zoom value, and the like of the virtual camera 201. The parameter deriving unit 402 may derive the virtual camera parameters by an arithmetic operation or by referring to a lookup table. The virtual camera parameters may be divided into extrinsic parameters (the position/orientation and the like of the virtual camera 201) and intrinsic parameters (the zoom value and the like of the virtual camera 201). If the virtual camera parameters are divided into extrinsic parameters and intrinsic parameters, the virtual camera parameters may be formed by, for example, a matrix representing the extrinsic parameters and a matrix representing the intrinsic parameters.

A constraint management unit 403 acquires, from, for example, the ROM 303, constraint information (to be referred to as virtual camera constraint conditions hereinafter) for limiting a viewpoint (virtual viewpoint) based on the operation of the operator accepted by the virtual camera operation unit 401, and manages it. The virtual camera constraint conditions indicate, for example, constraint conditions for the virtual camera parameters derived by the parameter deriving unit 402, or constraint conditions for the position, orientation, zoom value, and the like of the virtual camera 201. Unlike the cameras of the N sensor systems 101, the virtual camera 201 can perform image capturing by freely moving the viewpoint but cannot always generate an image from an arbitrary viewpoint. If, for example, the virtual camera 201 is made to face in a direction in which a target object captured by none of the cameras of the N sensor systems 101 is captured, an image captured by the virtual camera 201 cannot be obtained. If the zoom magnification of the virtual camera 201 is increased, the image quality degrades due to the resolution constraint. Therefore, a zoom magnification falling within a range where a given image quality is maintained and the like may be set as virtual camera constraint conditions. Note that the virtual camera constraint conditions may be derived in advance based on, for example, the arrangement of the camera.

A constraint determination unit 404 determines whether the virtual camera parameters derived by the parameter deriving unit 402 satisfy the virtual camera constraint conditions managed by the constraint management unit 403. If the virtual camera constraint conditions are satisfied, the constraint determination unit 404 outputs the virtual camera parameters derived by the parameter deriving unit 402 to a virtual camera path management unit 406; otherwise, the constraint determination unit 404 may instruct, for example, the virtual camera operation unit 401 to cancel the acceptance of the operation input by the operator. The constraint determination unit 404 may control the virtual camera parameters derived by the parameter deriving unit 402 to satisfy the virtual camera constraint conditions. This allows the constraint determination unit 404 to control so the virtual camera 201 does not move from a position which satisfies the virtual camera constraint conditions or control to return the virtual camera 201 to a position which satisfies the virtual camera constraint conditions.

A feedback output unit 405 feeds back, to the operator, the determination result of the constraint determination unit 404 (for example, information indicating whether the virtual camera parameters derived by the parameter deriving unit 402 satisfy the virtual camera constraint conditions). Assume, for example, that the operator operates the virtual camera 201 to move upward (the positive direction of the Yc-axis) but the movement destination does not satisfy the virtual camera constraint conditions. In this case, the feedback output unit 405 notifies the operator that the virtual camera 201 cannot be moved upward any more. As a notification method, there are provided a method of outputting a sound or a message via the output unit 306, a method of changing the color of a screen, and a method of locking the virtual camera operation unit 401.

If the feedback operation is performed by displaying an image, the feedback output unit 405 may display, on the output unit 306, based on the virtual camera constraint conditions managed by the constraint management unit 403, an image corresponding to a region to which the position of the virtual viewpoint is limited. For example, when the feedback output unit 405 displays, on the output unit 306, an image indicating whether the virtual viewpoint falls within the limited region, the operator can recognize whether a desired virtual-viewpoint image can be generated at the virtual viewpoint designated by the operation. If no desired virtual-viewpoint image can be generated, the operator can perform an operation of designating again a virtual viewpoint at a position which satisfies the virtual camera constraint conditions. Note that contents displayed on the output unit 306 by the feedback output unit 405 are not limited to this. For example, an image in which a portion, corresponding to the limited region (a region which does not satisfy the virtual camera constraint conditions), of a region (the interior of a stadium or the like) as a virtual-viewpoint designation target is filled with a predetermined color may be displayed.

A data designation unit 407 accepts, via the input unit 304, designation of the type of generation of a live image (sound) and replay image (sound) by the operator. Then, the data designation unit 407 outputs, to the virtual camera path management unit 406, an instruction for designating the virtual camera parameters based on the designation.

The virtual camera path management unit 406 manages the path (virtual camera path) of the virtual camera 201 corresponding to the operation of the operator. The virtual camera path is formed by a set (array) of pieces of information (for example, the virtual camera parameters) each indicating the position and orientation of the virtual camera 201 for each frame. If, for example, a frame rate of 60 frames/sec is set, the virtual camera path for one sec is formed by 60 virtual camera parameter arrays. The virtual camera path management unit 406 transmits, to the back-end server 104, the virtual camera parameters corresponding to the type designated by the data designation unit 407. The back-end server 104 generates a virtual-viewpoint image and/or virtual-viewpoint sound using the received virtual camera parameters.

The virtual camera path management unit 406 can also save/manage, as a virtual camera path, the virtual camera parameters already transmitted to the back-end server 104. By saving the virtual camera path, the virtual camera path is useful to regenerate a virtual-viewpoint image and virtual-viewpoint sound. For example, the virtual camera path generated by the operator who performs an advanced virtual camera operation can be reused by another operator. Furthermore, when the virtual camera path management unit 406 stores a plurality of virtual camera paths, the operator can select a scene corresponding to each of the plurality of virtual camera paths based on designation by the data designation unit 407. When accumulating the virtual camera path in the virtual camera path management unit 406, the virtual camera path may be accumulated in association with meta information. The meta information includes, for example, the script of a scene, the elapsed time of a game, and player information corresponding to each virtual camera path.

Examples of the operations of the data designation unit 407 and virtual camera path management unit 406 will now be described. If the operator wants to output a live image (sound), generation of a live image (sound) is designated for the data designation unit 407. Upon receiving the designation, the data designation unit 407 instructs the virtual camera path management unit 406 to transmit, to the back-end server 104, the virtual camera parameters derived by the parameter deriving unit 402 and received from the constraint determination unit 404. Upon receiving the instruction, the virtual camera path management unit 406 transmits the virtual camera parameters derived by the parameter deriving unit 402 to the back-end server 104.

If the operator wants to output a replay image (sound), generation of a replay image (sound) is designated for the data designation unit 407. At this time, the operator may designate time, meta information, a reproduction speed, and the like. In this case, the data designation unit 407 transmits the information (that is, the time, meta information, reproduction speed, and the like) designated by the operator to the virtual camera path management unit 406. Upon receiving the information, the virtual camera path management unit 406 specifies the virtual camera path (virtual camera parameters) based on the designation received from the data designation unit 407, and transmits the specified virtual camera path to the back-end server 104. If the operator instructs the data designation unit 407 to generate a replay image (sound), he/she may instruct the movement of the virtual camera 201 at the same time.

As an example of the instruction of the operator to the data designation unit 407, assume that if the operator designates generation of a replay image (sound), a scene name "goal scene" and a designated time before and after the scene "10 sec in total" are designated as meta information. In this case, the virtual camera path management unit 406 specifies the virtual camera path based on the designated information. If the operator designates, as a reproduction speed, slow reproduction in the virtual camera path while a ball flies toward a goal, the virtual camera path management unit 406 instructs the back-end server to generate a low-rate image (sound). Alternatively, in this case, a data output unit 408 is instructed to perform slow reproduction via the back-end server.

The data output unit 408 outputs, via the output unit 306, the virtual-viewpoint image and virtual-viewpoint sound received from the back-end server 104. The operator can operate the position of the virtual camera 201 while confirming the output virtual-viewpoint image and virtual-viewpoint sound via the data output unit 408. Depending on the contents fed back from the feedback output unit 405, the data output unit 408 may control to output the virtual-viewpoint image and virtual-viewpoint sound via the output unit 306 in association with the limited region according to the virtual camera constraint conditions. For example, if the position of the virtual viewpoint designated by the operator is included in the limited region, the data output unit 408 may display a virtual-viewpoint image at another viewpoint. The other viewpoint is, for example, a position which is close to the position of the virtual viewpoint designated by the operator and falls outside the limited region. This can reduce the operator's labor of designating again a viewpoint outside the limited region.

A camera work designation unit 409 can designate a camera work (the motion of the viewpoint (virtual viewpoint) of the virtual camera 201) in accordance with the operation of the operator via the input unit 304. If a camera work is designated, the virtual camera 201 moves in accordance with the designated camera work. If a camera work is designated, the parameter deriving unit 402 changes the virtual camera parameters. For example, if a "linear movement" is designated as a camera work, the parameter deriving unit 402 derives the virtual camera parameters so that the virtual camera 201 linearly moves. This allows the operator to readily perform an operation of causing the virtual camera 201 to track a player while moving in parallel to a sideline. For example, if a "go-around movement" is designated as a camera work, the parameter deriving unit 402 derives the virtual camera parameters so that the virtual camera 201 moves on a circumference. Furthermore, the parameter deriving unit 402 adjusts the virtual camera parameters so that the virtual camera 201 always faces the rotation center. This allows the operator to readily perform an operation of causing the virtual camera 201 to rotate around a specific player. If the operator does not want to limit a camera work to a specific one, he/she can designate a "free movement" as a camera work. In this case, the parameter deriving unit 402 can derive the virtual camera parameters which determine a moving direction without any constraints such as a linear direction and circumferential direction. Note that a designatable camera work is not limited to them, and other camera works may be designatable.

A switching unit 410 switches the position of the virtual camera 201 to a position spatially separated from the current position to have a common image-capturing space by the operation of the operator via the input unit 304. More specifically, the switching unit 410 accepts an instruction to switch the position of the virtual camera 201 to a position (and orientation) different from the current position. This instruction includes an instruction to switch the current position of the virtual camera 201 to a position on the opposite side with respect to a predetermined target (for example, a specific object) and an instruction to switch the current position of the virtual camera 201 to a specific position designated by the operator. Subsequently, the switching unit 410 sets the position/orientation of the virtual camera 201 after switching based on the accepted instruction, and transfers information about the position/orientation to the parameter deriving unit 402. The switching operation can move the virtual camera 201 to a desired position and orientation as long as the virtual camera constraints managed by the constraint management unit 403 are satisfied. Note that the position and orientation of the virtual camera 201 after switching will be described later with reference to FIGS. 7A to 7C.

As an example, in a soccer scene, the position of the virtual camera 201 beside the corner satisfies the virtual camera constraints. In response to occurrence of a corner kick event, it is possible to move, to a position beside the corner, the virtual camera 201 which is capturing the field at a predetermined position.

In accordance with the operation of the operator via the input unit 304, the switching unit 410 can switch, to a desired position, the new position of the virtual camera 201 after switching. As an example, assume that in a soccer scene, the virtual camera 201 is tracking and capturing a specific object (player). Assume also that while tracking the specific object, another object interrupts between the virtual camera 201 and the specific object, and the virtual camera 201 cannot capture the specific object. In this case, the operator can switch the position of the virtual camera 201 to a position to capture the object from the opposite side of the current position of the virtual camera 201 with respect to the specific object. This allows the virtual camera 201 after switching to continuously capture the object.

Note that the motion of the virtual camera 201 has not been set immediately after the switching unit 410 switches the position of the virtual camera 201. That is, the virtual camera 201 immediately after switching is in a stopped state. The motion of the virtual camera 201 after switching is determined by a camera work determination unit 411 and an initial speed setting unit 412, as will be described below.

Based on the motion (camera work) including the moving direction of the virtual camera 201 immediately before switching, the camera work determination unit 411 determines the camera work of the virtual camera 201 after switching. To do this, the camera work determination unit 411 obtains information of the camera work before switching, which has been designated by the camera work designation unit 409, and determines the camera work of the virtual camera 201 after switching based on the obtained information.

If a "linear movement" is obtained as the camera work before switching, the camera work determination unit 411 determines a "linear movement" as the camera work of the virtual camera 201 after switching. Similarly, if a "go-around movement" is obtained as the camera work before switching, the camera work determination unit 411 determines a "go-around movement" as the camera work of the virtual camera 201 after switching. These determination processes are limited to a case in which the virtual camera 201 immediately before switching is moving. That is, if the virtual camera 201 immediately before switching stays still, even if a "linear movement" is obtained as the camera work before switching, the camera work determination unit 411 does not determine a "linear movement" as the camera work of the virtual camera 201 after switching. Furthermore, if the motion of the virtual camera 201 immediately before switching includes only rotation, the camera work determination unit 411 does not determine a "linear movement" as the camera work of the virtual camera 201 after switching. Note that a case in which the motion includes only rotation indicates a case in which only the orientation of the virtual camera 201 changes and the position remains the same, for example, a case in which the virtual camera 201 is panning at a given position (changing its direction horizontally).

On the other hand, if a "free movement" is obtained as the camera work before switching, the camera work determination unit 411 determines, based on the virtual camera path of the virtual camera 201 immediately before switching, the camera work of the virtual camera 201 after switching. The camera work determination unit 411 obtains the virtual camera path immediately before switching from the virtual camera path management unit 406. For example, if the camera work determination unit 411 recognizes based on the obtained virtual camera path that the camera path immediately before switching is a linear movement, it determines a "linear movement" as the camera work after switching. Note that the camera work cannot be determined by the above processing, the camera work determination unit 411 determines "uncertain" as the camera work of the virtual camera after switching.

In accordance with the camera work determined by the camera work determination unit 411, the initial speed setting unit 412 sets, as the initial speed of the motion of the virtual camera 201 immediately after switching, the speed of the motion of the virtual camera 201 immediately before switching when viewed from the world coordinate system. This can maintain the motion of the virtual camera 201 before and after switching when viewed from the world coordinate system, thereby allowing a cooperative operation.

If the camera work after switching determined by the camera work determination unit 411 is a "linear movement", the initial speed setting unit 412 sets the initial speed of the motion of the virtual camera 201 immediately after switching as follows. That is, the initial speed setting unit 412 sets, as the initial speed of the virtual camera 201 immediately after switching, the speed (moving direction and speed) of the virtual camera 201 immediately before switching when viewed from the world coordinate system. At this time, only if the same object can be captured before and after switching, the initial speed setting unit 412 may cause motions before and after switching to cooperate with each other. That is, if the same object cannot be captured before and after switching, the initial speed setting unit 412 may set the virtual camera 201 immediately after switching in the stopped state. A case in which the same object can be captured before and after switching indicates, for example, a case in which the position of the virtual camera 201 is switched to a position on the opposite side with respect to the object.

On the other hand, if the camera work after switching determined by the camera work determination unit 411 is a "go-around movement", the initial speed setting unit 412 sets the initial speed of the motion of the virtual camera 201 immediately after switching as follows. That is, the initial speed setting unit 412 sets, as the initial speed of the virtual camera 201 immediately after switching, the rotation center and angular velocity (rotation direction and speed) of the virtual camera 201 immediately before switching when viewed from the world coordinate system. Furthermore, if the camera work after switching determined by the camera work determination unit 411 is "uncertain", the initial speed setting unit 412 need not cause the motions before and after switching to cooperate with each other. That is, in this case, the virtual camera 201 immediately after switching stays still.

If the direction of the virtual camera 201 largely changes before and after switching, the operator may temporarily lose sight of the direction, and operate the virtual camera in an unintentional direction. To prevent such possibility, the virtual camera operation unit 401 may disable the operation of the operator for a predetermined period after switching. For example, if the direction of the virtual camera 201 immediately after switching is different from that immediately before switching by a predetermined angle or more, the virtual camera operation unit 401 may disable the operation of the operator. If the operation of the operator is disabled, the virtual camera 201 is automatically operated in accordance with the motion set by the initial speed setting unit 412. This automatic operation is continued until the operation of the operator is enabled again, as will be described later. This allows a smooth camera work before and after switching.

If a predetermined condition is satisfied after disabling the operation of the operator, the virtual camera operation unit 401 can return the operation of the operator to the enabled state. For example, if the operation of the operator for the virtual camera operation unit 401 is neutral, the operation of the operator may be returned to the enabled state. If, for example, the operator performs the operation using the joy stick as the input unit 304, the neutral state indicates a state in which the joy stick is not tilted in either the front-and-back direction or the horizontal direction.

Figure 13A:
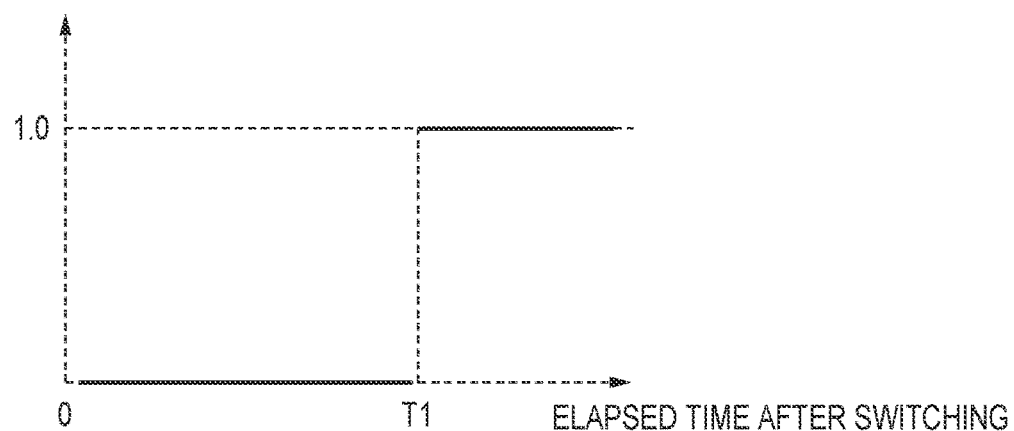
FIGS. 13A and 13B are views for explaining a period during which a user operation is disabled.
Figure 13B:
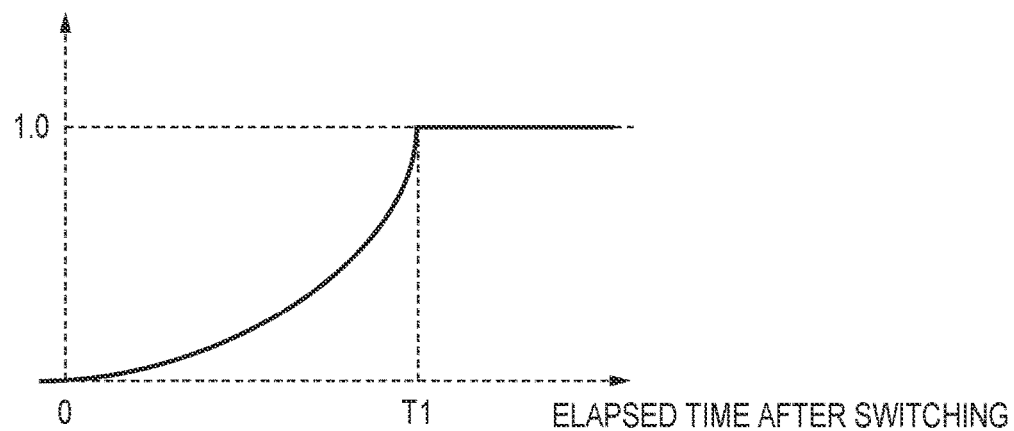

The virtual camera operation unit 401 may return the operation of the operator to the enabled state when a predetermined time elapses after the operation of the operator is disabled. FIGS. 13A and 13B are views for explaining a period during which the operation of the operator is disabled. For example, as shown in FIG. 13A, the virtual camera operation unit 401 can set 0 in a weight for the operation of the operator from when the position of the virtual camera 201 is switched until a predetermined time (T1) elapses. During a period when the weight is 0, the operation of the operator is disabled, and the virtual camera 201 after switching is automatically operated. After the predetermined time (T1) elapses, the virtual camera operation unit 401 enables the operation of the operator, thereby ending the automatic operation.

After the operation of the operator is disabled, the operation of the operator may be gradually enabled. For example, as shown in FIG. 13B, the motion set by the initial speed setting unit 412 and the operation of the operator may be weighted, thereby setting a period during which the operation of the operator is disabled. That is, the weight of the operation of the operator immediately after switching is set to 0, and made to gradually approach 1. After the virtual camera 201 is switched, the virtual camera operation unit 401 makes the weight of the operation of the operator approach 1 so that the weight is set to 1 when the predetermined time (T1) elapses. When the weight of the operation of the operator is set to 1, the virtual camera 201 moves in accordance with the operation of the operator. When the operation of the operator is enabled, the automatic operation ends.

Note that the feedback output unit 405 may output, via the output unit 306, information about the period during which the operation of the operator is disabled, thereby notifying the operator of the information. Alternatively, the feedback output unit 405 may output information about a period during which the virtual camera 201 after switching is automatically operated, thereby notifying the operator of the information. This allows the operator to more correctly grasp the status of the operation for the virtual camera 201 immediately after switching.

Figure 5A:
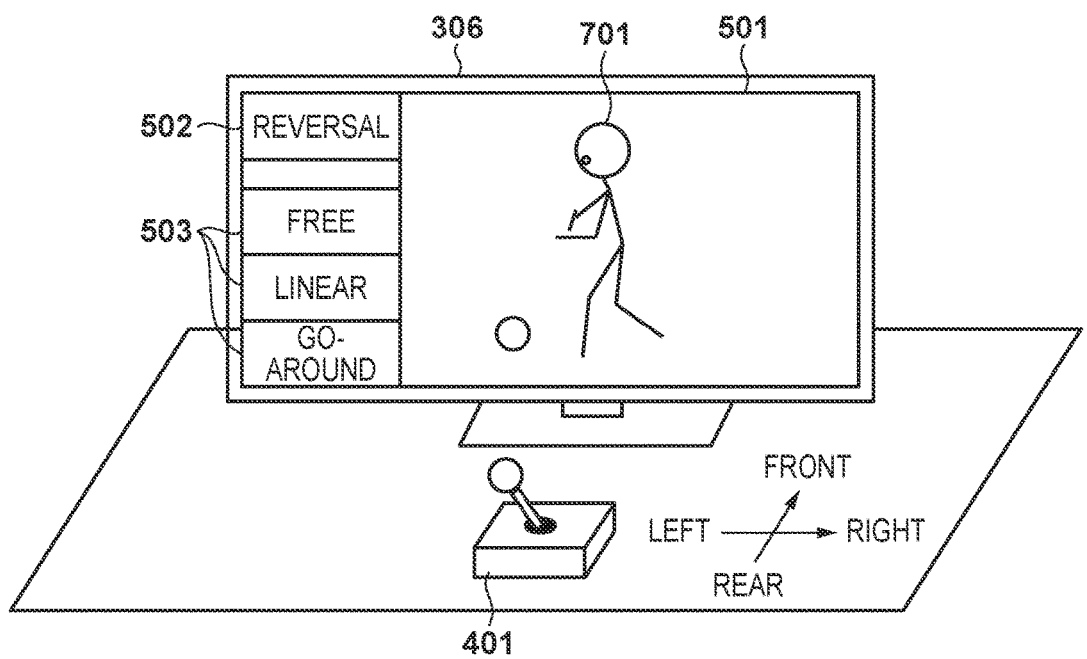
FIGS. 5A and 5B are views for explaining the operation mode of the virtual camera 201 by the information processing apparatus 105.
Figure 5B:
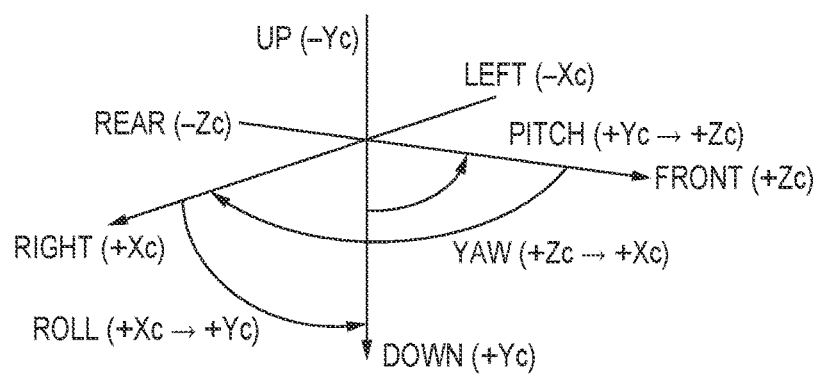

FIGS. 5A and 5B are views for explaining the operation mode of the virtual camera 201 by the information processing apparatus 105. Referring to FIG. 5A, a virtual-viewpoint image 501 viewed from the virtual camera 201 operated by the operator (that is, the virtual-viewpoint image 501 corresponding to a virtual viewpoint) is displayed on the display (output unit 306). The operator can operate the virtual camera 201 using the joy stick (input unit 304) while viewing the virtual-viewpoint image 501. Note that in FIG. 5A, the display is formed by a touch panel, and a virtual camera switching button 502 and camera work designation buttons 503 function as the input unit 304.

When the operator views an image captured from the opposite side with respect to an object 701 in the virtual-viewpoint image 501 currently displayed on the display, he/she selects "reversal" of the virtual camera switching button 502. This selection operation is performed using, for example, a mouse (not shown). If the virtual camera switching button 502 is selected, the position of the virtual camera 201 is switched to the position on the opposite side with respect to the object 701. The virtual-viewpoint image 501 displayed on the display is also changed to a virtual-viewpoint image viewed from the viewpoint of the virtual camera 201 after switching. Note that the virtual camera switching button 502 may be added with another preset button to switch to the virtual camera 201 in addition to "reversal" shown in FIG. 5A.

The operator can designate a desired camera work by selecting one of the camera work designation buttons 503. The parameter deriving unit 402 derives the virtual camera parameters in accordance with the designated camera work. This allows the operator to readily designate a camera work such as a "linear movement" or "go-around movement". The motion of the virtual camera 201 when a camera work is designated will be described later with reference to FIGS. 6A to 6C.

FIG. 5B is a view for explaining an operation for the position/orientation of the virtual camera 201 (the position/orientation of a virtual viewpoint) in the virtual camera coordinate system (Xc, Yc, Zc).

The operator can designate a change (movement) of the position of the virtual camera 201 in three directions, that is, a front-and-rear direction (Zc-axis), a horizontal direction (Xc-axis), and a vertical direction (Yc-axis). That is, a change (movement) of the position has three degrees of freedom. The correspondence between the moving direction and the virtual camera coordinate system is as follows. That is, assume that an object exists in the field 202 shown in FIG. 2. In this case, the positive direction of the Zc-axis represents the front direction (a direction toward the object), and the negative direction of the Zc-axis represents the rear direction (a direction away from the object). The positive direction of the Xc-axis represents the right direction (the right when facing the object) and the negative direction of the Xc-axis represents the left direction (the left when facing the object). Furthermore, the positive direction of the Yc-axis represents the down direction (the down direction (field direction) when facing the object) and the negative direction of the Yc-axis represents the up direction (the sky direction when facing the object).

For a change (rotation) of the orientation, three rotation directions, that is, yaw, pitch, and roll directions can be designated. That is, a change (rotation) of the orientation has three degrees of freedom. The yaw indicates rotation about the Yc-axis. The pitch indicates rotation about the Xc-axis. The roll indicates rotation about the Zc-axis. By combining the movement and rotation, an operation having at least six degrees of freedom becomes possible. Each degree of freedom may be associated with the joy stick (input unit 304). For example, since one joy stick has two degrees of freedom in the front-and-rear direction and the horizontal direction, an operation of the six degrees of freedom becomes possible using three joy sticks.

When three joy sticks are used, an example of associating the joy sticks with the motion of the virtual camera 201 will be described next. Note that the front-and-rear direction and horizontal direction of each joy stick correspond to the directions shown in FIG. 5A. In this example, the motion in the front-and-rear direction of the first joy stick is associated with the motion of the virtual camera 201 along the Zc-axis, and the motion in the horizontal direction of the joy stick is associated with the motion of the virtual camera 201 along the Xc-axis. The motion in the front-and-rear direction of the second joy stick is associated with the motion of the virtual camera 201 along the Yc-axis, and the motion in the horizontal direction of the joy stick is associated with the roll of the virtual camera 201. The motion in the front-and-rear direction of the third joy stick is associated with the pitch of the virtual camera 201, and the motion in the horizontal direction of the joy stick is associated with the yaw of the virtual camera 201. By associating the motion of the joy stick with the motion (movement/rotation) of the virtual camera 201 so as to sensuously match each other, like the first joy stick, the operation of the operator can become easy.

Figure 6A:
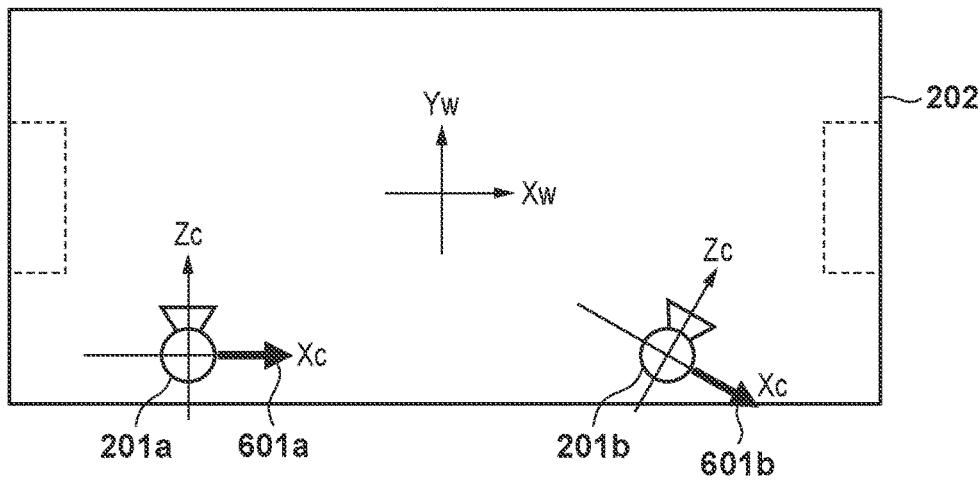
FIGS. 6A to 6C are views for explaining the motion of the virtual camera in accordance with a camera work.
Figure 6B:
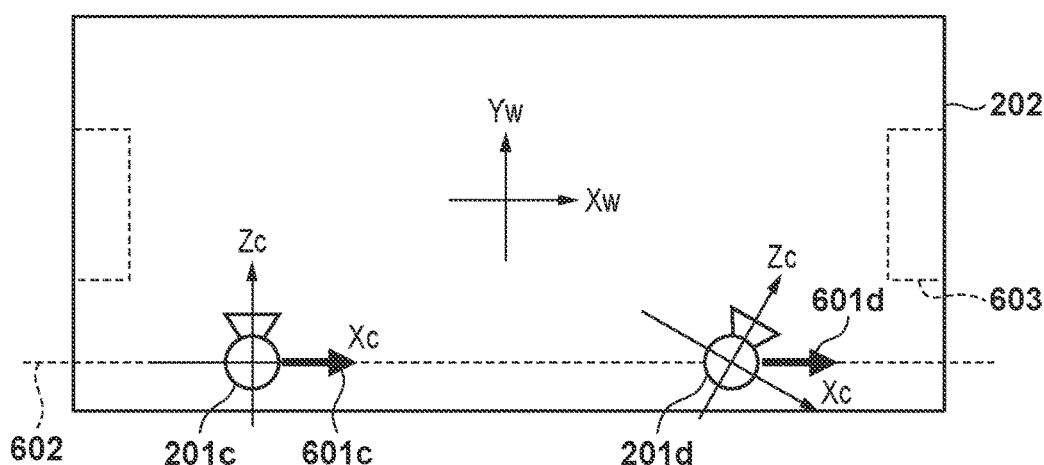
Figure 6C:
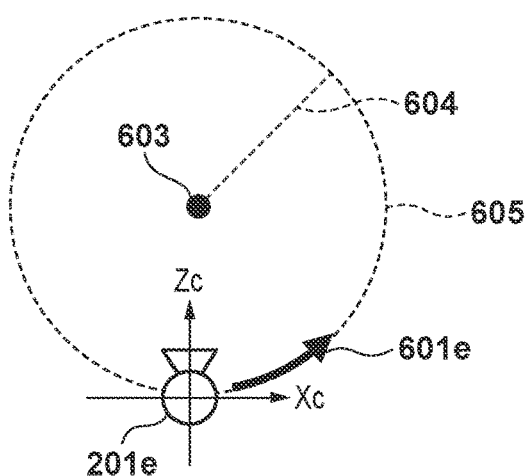

FIGS. 6A to 6C are views for explaining the motion of the virtual camera 201 when the camera work designation unit 409 designates a camera work.

FIG. 6A is a view for explaining motions 601a and 601b of virtual cameras 201a and 201b when a "free movement" is designated as a camera work. In the "free movement", the direction of the motion 601a of the virtual camera 201a always matches the direction of the operation when viewed from the virtual camera coordinate system. If, for example, the operator tilts the joy stick (input unit 304) rightward, the virtual camera 201 moves in the positive direction of the Xc-axis in the virtual camera coordinate system. However, the moving direction changes when viewed from the world coordinate system (Xw, Yw). For example, the direction of the motion 601a of the virtual camera 201a is the positive direction of the Xw-axis. However, the direction of the motion 601b of the virtual camera 201b is a direction between the positive direction of the Xw-axis and the negative direction of the Yw-axis.

FIG. 6B shows motions 601c and 601d of virtual cameras 201c and 201d when a "linear movement" is designated as a camera work. When a "linear movement" is designated, the virtual camera 201 moves on a straight line 602 virtually drawn in an image-capturing space (for example, a stadium). The virtual straight line 602 may be set by the operator or preset by the parameter deriving unit 402. Alternatively, the virtual straight line 602 is set on the Xw-axis (horizontal direction) or the Yw-axis (front-and-rear direction) in the world coordinate system in accordance with the orientation of the virtual camera 201 when the "linear movement" is designated as a camera work. If the virtual straight line 602 is set on the Xw-axis (horizontal direction), the operation of the joy stick in the horizontal direction causes the virtual camera 201 to move on the virtual straight line 602. If the virtual straight line 602 is set on the Yw-axis (front-and-rear direction), the operation of the joy stick in the front-and-rear direction causes the virtual camera 201 to move on the virtual straight line 602.

Referring to FIG. 6B, the virtual straight line 602 is set along the sideline of the field 202. In this case, for example, if the joy stick is tilted rightward, the virtual camera 201c moves on the virtual straight line 602 in the positive direction of the Xw-axis in the world coordinate system (motion 601c). That is, the direction of the motion in the world coordinate system always matches. However, when viewed from the virtual camera coordinate system, the moving direction changes. For example, the moving direction of the motion 601c of the virtual camera 201c is the right direction. However, the moving direction of the motion 601d of the virtual camera 201d is the right front direction (a direction between the positive direction of the Zc-axis and that of the Xc-axis).

Note that if the virtual camera 201 rotates by the operation of the operator by a predetermined value or more, the camera work designation unit 409 cancels the "linear movement" to change the camera work to a "free movement" regardless of an instruction of the operator. This is because if the virtual camera 201 rotates by the predetermined value or more, the moving direction of the virtual camera 201 does not match the direction of the operation when viewed from the virtual camera coordinate system, and the operation by the operator becomes difficult. The camera work of the "linear movement" is effective when, for example, generating an image by tracking a player while moving in parallel to the sideline. Even if the virtual camera undergoes yaw rotation by a small amount to face a goal 606, like the virtual camera 201d, a linear movement along the sideline is easy. If the camera work is a "free movement", the orientation of the virtual camera is changed, like the virtual camera 201b, the virtual camera moves in a direction deviated from the straight line. It is thus necessary to adjust the operation direction to the right front direction in accordance with the change of the orientation of the virtual camera 201.

FIG. 6C shows a motion 601e of a virtual camera 201e when a "go-around movement" is designated as a camera work. In the "go-around movement", the virtual camera 201 moves on a virtual circle 605. If, for example, the operator tilts the joy stick rightward, the virtual camera 201e moves on the circle 605 in the counterclockwise direction. In addition, the orientation of the virtual camera 201 is changed to always face a rotation center 603. For example, the virtual circle 605 is preset on the field. Alternatively, when designating a "circumferential movement" as a camera work, the operator may designate the rotation center 603 and a rotation radius 604. Note that in the case of the "go-around movement", the movement of the virtual camera 201 may be managed by an angular velocity (rotation direction and speed).

FIGS. 7A to 7C are views for explaining the position and orientation of the virtual camera 201 before and after switching. Note that a stadium is set as an image-capturing space in FIGS. 7A and 7B, and a concert hall is set as an image-capturing space in FIG. 7C.

FIG. 7A shows an example in which the position of an object is known. Assume that the position of an object 701f is obtained using, for example, an auto tracking technique, and the operator already knows the position. Referring to FIG. 7A, a virtual camera 201g after switching is located in the front direction (the positive direction of the Zc-axis) of the optical axis of a virtual camera 201f before switching. A distance (d1) from the virtual camera 201f before switching to the object 701f is almost equal to a distance (d2) from the virtual camera 201g after switching to the object 701f. That is, the virtual camera 201g is located on the opposite side of the virtual camera 201f with respect to the object 701f, and has a position/orientation to have a common image-capturing space including the object 701f. The orientation of the virtual camera 201g after switching faces in a direction opposite to that of the virtual camera 201f before switching when viewed from the world coordinate system.

FIG. 7B shows an example in which the position of an object is unknown. In this case, the periphery of the field is set as a virtual rail 702 in the image-capturing space (stadium). The position of a virtual camera 201i after switching from a virtual camera 201h is set at a point where the virtual rail 702 intersects the front direction of the optical axis of the virtual camera 201h. Even if the object is unknown, the position of the virtual camera 201i after switching is set to be almost symmetrical to the position of the virtual camera 201h with respect to a location, a focus position, or a newly set object (an almost intermediate point between the position of the virtual camera 201h and that of the virtual camera 201i) in the field. The position/orientation of the virtual camera 201i after switching faces in a direction opposite to that of the virtual camera 201h before switching when viewed from the world coordinate system so as to have an image-capturing space common to the virtual camera before switching. Furthermore, if a virtual camera 201j is switched to a virtual camera 201k, the front direction of the optical axis of the virtual camera 201j before switching intersects the virtual rail 702 a plurality of times. In this case, an intersecting point farthest from the virtual camera 201j before switching is set as the position of the virtual camera 201k after switching.

FIG. 7C shows another example in which the position of an object is unknown. In this case, a virtual center line 703 is preset in the image-capturing space (concert hall). A virtual camera 201l is switched to a virtual camera 201m using the virtual center line 703. The position of the virtual camera 201m after switching is in the front direction of the optical axis of the virtual camera 201l before switching. Assume that a distance (d1) from the virtual camera 201l before switching to the virtual center line 703 is almost equal to a distance (d2) from the virtual camera 201m after switching to the virtual center line 703. That is, the virtual camera 201m is located on the opposite side of the virtual camera 201l with respect to the virtual center line 703, and has a position/orientation to have a common image-capturing space. The orientation of the virtual camera 201m after switching is in a direction opposite to that of the virtual camera 201*l* before switching when viewed from the world coordinate system.

Figure 8:
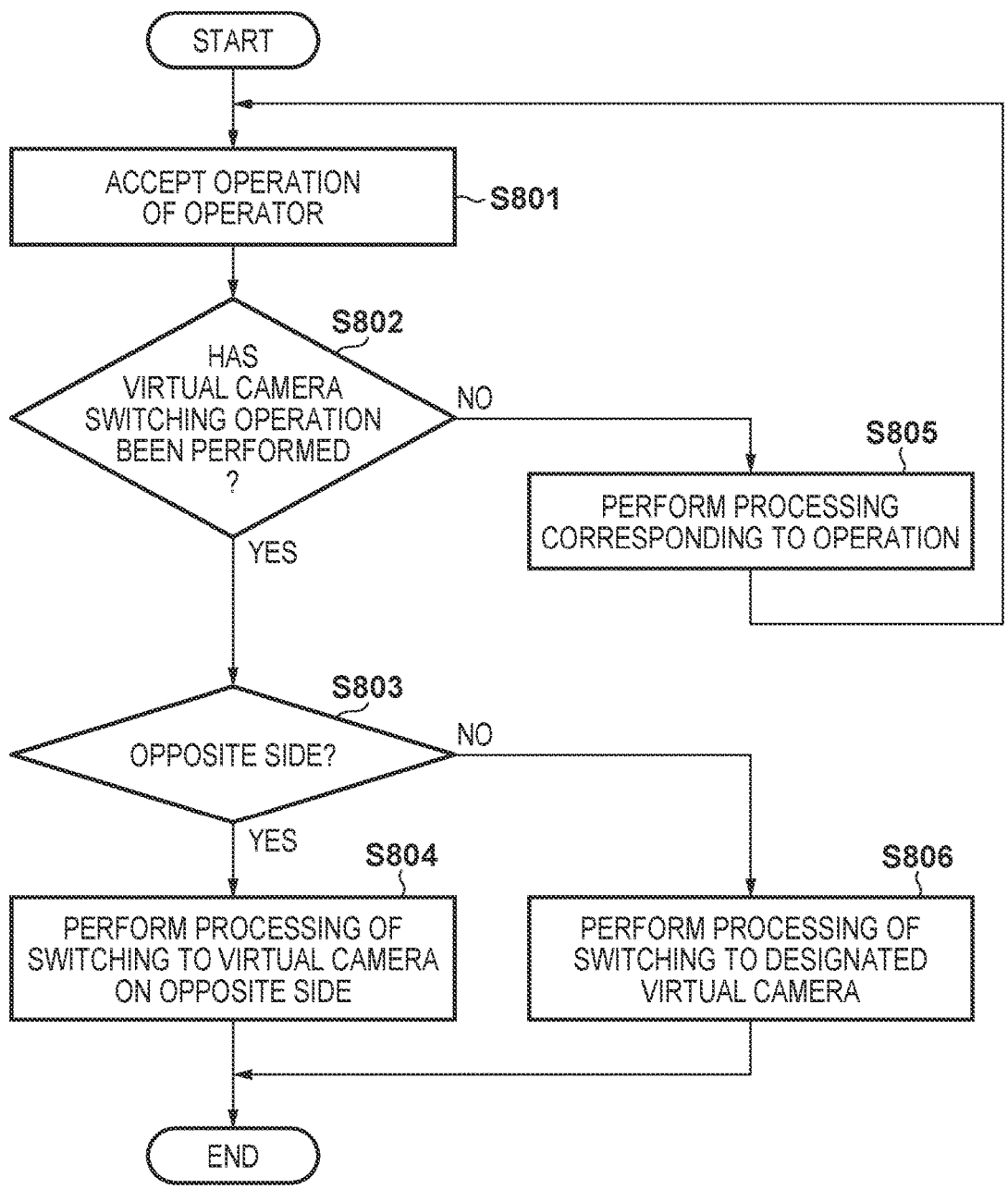
FIG. 8 is a flowchart for explaining processing of switching the position of the virtual camera 201.

FIG. 8 is a flowchart for explaining processing of switching the position of the virtual camera 201 by the information processing apparatus 105. In step S801, the information processing apparatus 105 accepts the operation of the operator via the input unit 304. In step S802, the switching unit 410 of the information processing apparatus 105 determines whether the accepted operation of the operator is an instruction operation for switching the position of the virtual camera 201 (virtual viewpoint) to a position different from the current position. For example, if the operator selects the virtual camera switching button 502 (FIG. 5A), the switching unit 410 determines that the operation of switching the virtual camera 201 has been performed. If it is determined that the switching operation of the virtual camera 201 has been performed (YES in step S802), the process advances to step S803; otherwise (NO in step S802), the process advances to step S805.

In step S803, the switching unit 410 determines whether it has been explicitly designated, by the operation of the operator, to move the position of the virtual camera 201 to a position on the opposite side with respect to a predetermined location/position (for example, an object). For example, if the operator selects the virtual camera switching button 502 (FIG. 5A), the switching unit 410 determines that it has been explicitly designated to move the position of the virtual camera 201 to a position on the opposite side with respect to the predetermined position (YES in step S803), the process advances to step S804. On the other hand, if the operator directly designates the position and orientation of the virtual camera 201 after switching or if the operator selects a virtual camera preset at a predetermined location (NO in step S803), the process advances to step S806.

In step S804, the switching unit 410 controls to switch the position of the virtual camera 201 to a position on the opposite side with respect to the predetermined position to have an image-capturing space common to the virtual camera before switching. The detailed processing procedure of this step will be described later with reference to FIG. 9.

In step S805, the information processing apparatus 105 performs processing corresponding to the operation of the operator. For example, if the virtual camera operation unit 401 accepts an operation of moving or rotating the virtual camera 201 by the operation of the operator, the information processing apparatus 105 performs corresponding processing. Alternatively, if the camera work designation unit 409 accepts designation of a camera work by the operation of the operator, the information processing apparatus 105 performs processing corresponding to the designation.

In step S806, the switching unit 410 controls to switch the virtual camera 201 operated by the operator to the virtual camera 201 at the designated position. For example, the position of the virtual camera 201 is switched to the preset position. Alternatively, the information processing apparatus 105 may display a 3D model of the image-capturing space (stadium or the like) on the output unit 306, and the operator may directly designate the position and orientation of the virtual camera 201 after switching on the 3D model. The detailed processing procedure of this step will be described later with reference to FIG. 10.

Figure 9:
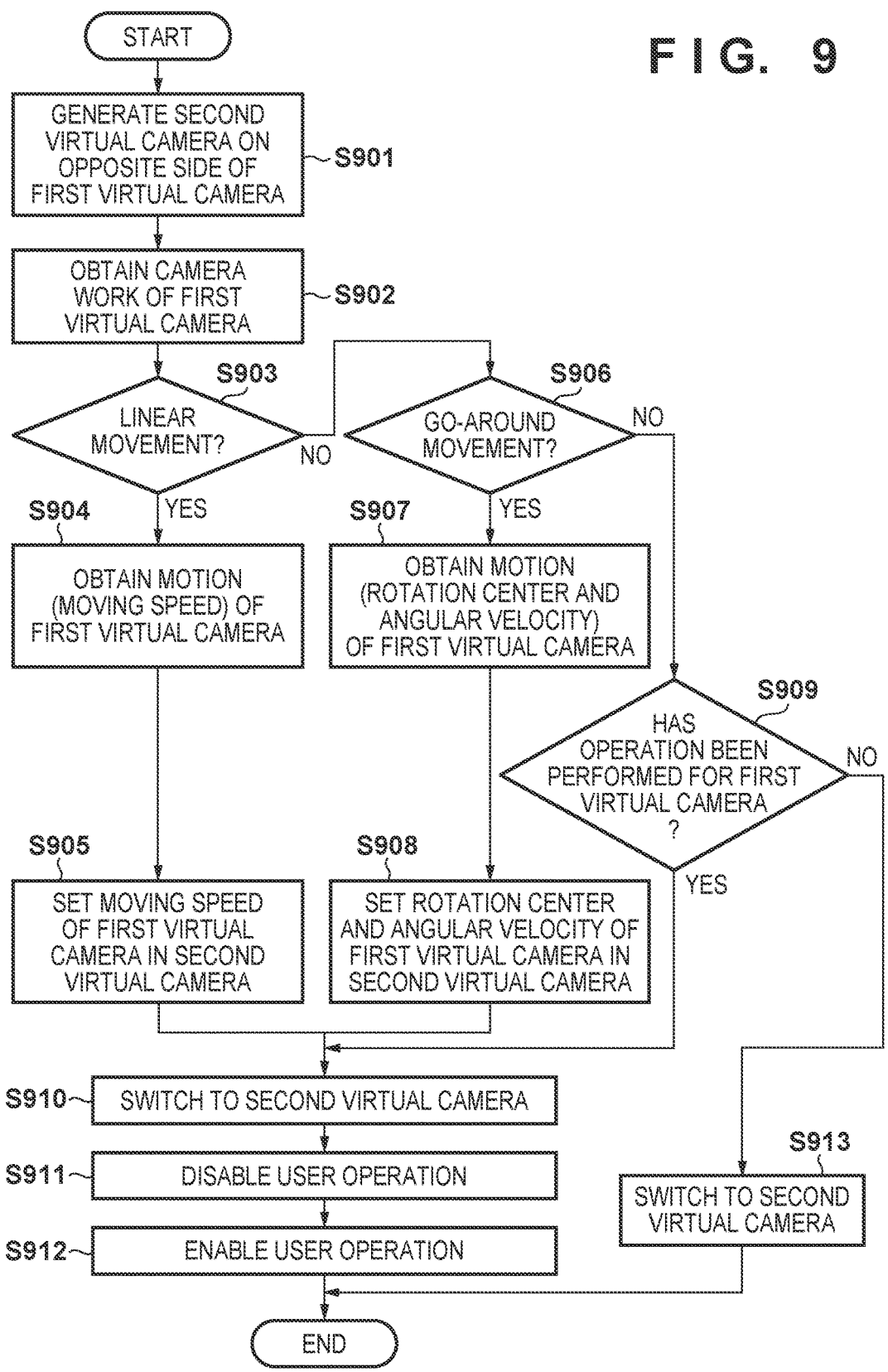
FIG. 9 is a flowchart for explaining a processing procedure in step S804.

FIG. 9 is a flowchart for explaining the processing procedure in step S804 of switching the position of the virtual camera to a position on the opposite side with respect to the predetermined position. The following description assumes that a first virtual camera 201A is set as the virtual camera 201 before switching and a second virtual camera 201B is set as the virtual camera 201 after switching.

In step S901, the switching unit 410 sets the position of the second virtual camera 201B. The position of the second virtual camera 201B is set, as described with reference to FIGS. 7A to 7C.

In step S902, the camera work determination unit 411 obtains the camera work (motion) of the first virtual camera 201A. In step S903, the camera work determination unit 411 determines whether the acquired camera work is a "linear movement". If the camera work is a "linear movement" (YES in step S903), the process advances to step S904; otherwise (NO in step S903), the process advances to step S906.

In step S904, the initial speed setting unit 412 obtains a motion (moving speed) of the first virtual camera 201A immediately before switching when viewed from the world coordinate system. The moving speed includes a moving direction and speed. In step S905, the initial speed setting unit 412 sets the obtained moving speed as the initial speed of the second virtual camera 201B.

If NO is determined in step S903, the camera work determination unit 411 determines in step S906 whether the obtained camera work is a "go-around movement". If the camera work is a "go-around movement" (YES in step S906), the process advances to step S907; otherwise (NO in step S906), the process advances to step S909.

In step S907, the initial speed setting unit 412 obtains a motion (rotation center and angular velocity) of the first virtual camera 201A immediately before switching when viewed from the world coordinate system. The angular velocity includes a rotation direction and speed. In step S908, the initial speed setting unit 412 sets the obtained rotation center and angular velocity as the initial speed of the second virtual camera 201B.

If NO is determined in step S906, the virtual camera operation unit 401 determines in step S909 whether the operation of the operator has been performed for the first virtual camera 201A. If the virtual camera operation unit 401 detects that, for example, the joy stick (input unit 304) has been tilted in one of the front-and-rear direction and horizontal direction, it is determined that the operation has been performed (YES in step S909), and the process advances to step S910. If the virtual camera operation unit 401 detects that, for example, the joy stick is located at a neutral position, it is determined that no operation has been performed (NO in step S909), and the process advances to step S913.

In step S910, the operation UI unit 470 switches the position/orientation of the first virtual camera 201A to the position/orientation of the second virtual camera 201B. More specifically, the parameter deriving unit 402 derives the virtual camera parameters based on the pieces of information obtained from the camera work designation unit 409, virtual camera switching unit 410, and initial speed setting unit 412. The virtual camera parameters are transmitted to the back-end server 104 via the virtual camera path management unit 406 after determination by the constraint determination unit 404. This changes the virtual-viewpoint image 501 displayed on the display to an image viewed from the viewpoint (virtual viewpoint) of the second virtual camera 201B.

In step S911, the virtual camera operation unit 401 disables the input of the operation of the operator for the second virtual camera 201B. Note that the feedback output unit 405 may output, to the display (output unit 306), information indicating that the operation is disabled. Note also that in FIG. 9, after switching to the second virtual camera 201B in step S911, the virtual camera operation unit 401 disables the operation of the operator in step S912. The present invention is not limited to this procedure, and a processing procedure in which the virtual camera operation unit 401 disables the operation of the operator to switch to the second virtual camera 201B may be adopted.

In step S912, the virtual camera operation unit 401 returns the operation of the operator for the second virtual camera 201B to the enabled state when the predetermined condition is satisfied. For example, when the operation of the operator sets the joy stick at the neutral position or when a predetermined time elapses, the operation of the operator is returned to the enabled state.

If NO is determined in step S909, the operation UI unit 470 switches, in step S913, the position/orientation of the first virtual camera 201A to the position/orientation of the second virtual camera 201B. The processing in this step is the same as that in step S911. This embodiment assumes that after the processing in step S913, the virtual camera operation unit 401 does not disable the operation of the operator. This is because if NO is determined in step S909, for example, the operation position of the joy stick (input unit 304) is at the neutral position and the possibility that the second virtual camera 201B moves in a direction unintended by the operator is low.

Figure 10:
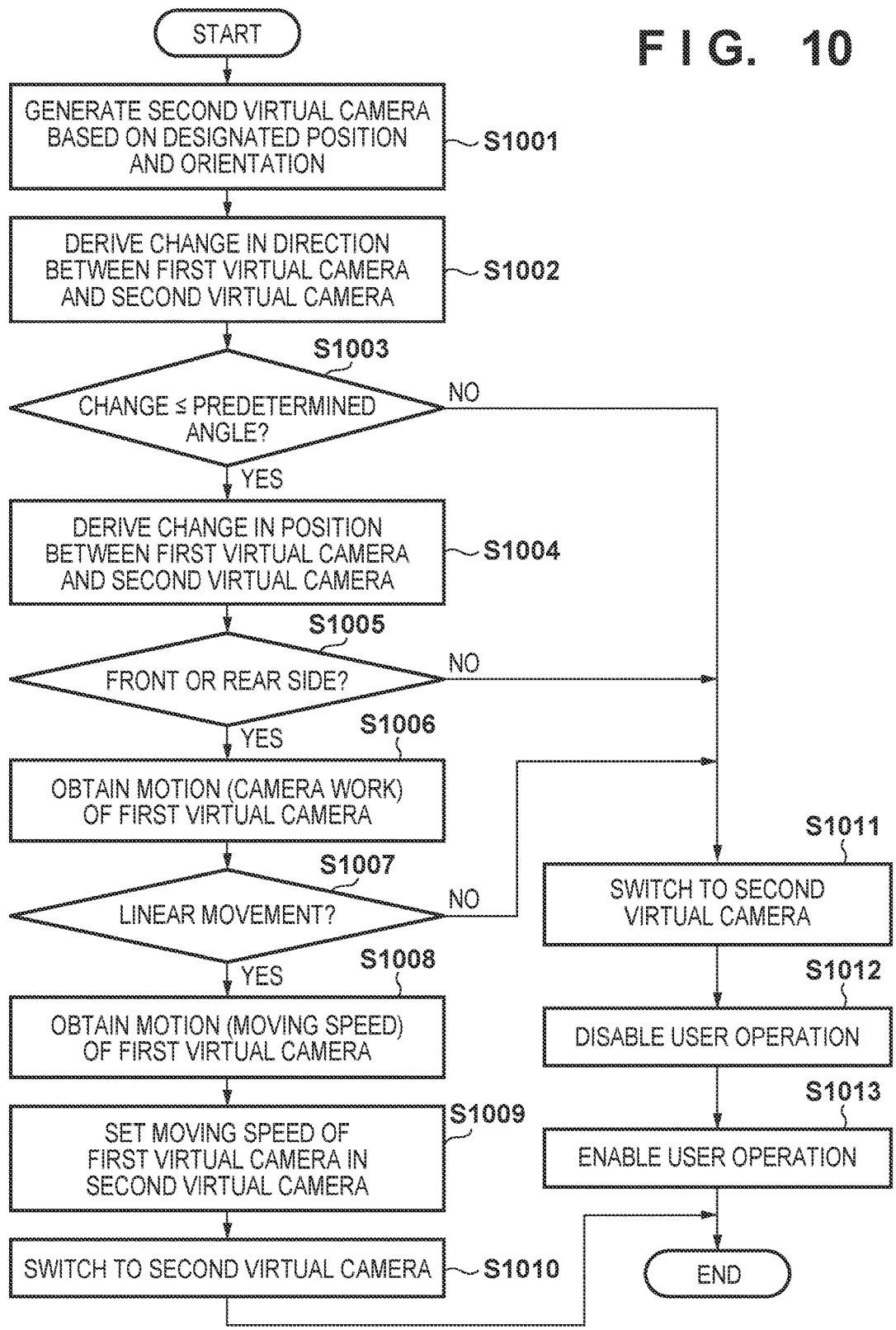
FIG. 10 is a flowchart for explaining a processing procedure in step S806.

FIG. 10 is a flowchart for explaining the processing procedure in step S806 in which the virtual camera is switched to a virtual camera having the designated position/orientation. Note that similarly to FIG. 9, the first virtual camera 201A is set as the virtual camera 201 before switching and the second virtual camera 201B is set as the virtual camera 201 after switching.

In step S1001, the switching unit 410 sets the position and orientation of the second virtual camera 201B based on the position and orientation designated by the operator via the input unit 304.

In step S1002, the camera work determination unit 411 derives a change in direction between the first virtual camera 201A and the second virtual camera 201B based on the positions and orientations of the first virtual camera 201A and second virtual camera 201B. For example, the camera work determination unit 411 obtains vectors in the optical-axis directions when viewed from the world coordinate system for the first virtual camera 201A and the second virtual camera 201B, and obtains an angle by calculating the inner product of the two vectors, thereby setting the angle as a change in direction. Alternatively, an angle formed by a direction from the first virtual camera 201A (a virtual viewpoint before switching) to the object and a direction from the second virtual camera 201B (a virtual viewpoint after switching) to the object may be set as a change in direction.

In step S1003, the camera work determination unit 411 determines whether the change in direction derived in step S1002 is equal to or smaller than a predetermined value (predetermined angle). The predetermined angle may be determined based on a ratio of the virtual camera 201 with respect to the horizontal angle of view. For example, when the horizontal angle of view is 50° and the ratio is 10%, the predetermined angle is set to fall within a range of 5° on each of the left and right sides. If the camera work determination unit 411 determines that the change in direction is smaller than the predetermined value (predetermined angle) (YES in step S1003), the process advances to step S1004; otherwise (NO in step S1003), the process advances to step S1011.

In step S1004, the camera work determination unit 411 derives a change in position between the first virtual camera 201A and the second virtual camera 201B. Subsequently, in step S1005, the camera work determination unit 411 determines whether the second virtual camera 201B is located on the front or rear side of the first virtual camera 201A (that is, on the Zc-axis). If the camera work determination unit 411 determines that the second virtual camera 201B is located on the front or rear side of the first virtual camera 201A (YES in step S1005), the process advances to step S1006.

In step S1006, the camera work determination unit 411 obtains the camera work (motion) of the first virtual camera 201A. In step S1007, the camera work determination unit 411 determines whether the obtained camera work is a "linear movement". If the camera work is a "linear movement" (YES in step S1007), the process advances to step S1008; otherwise (NO in step S1007), the process advances to step S1011.

In step S1008, the initial speed setting unit 412 obtains a motion (moving speed) of the first virtual camera 201A immediately before switching when viewed from the world coordinate system. The moving speed includes a moving direction and speed. In step S1009, the initial speed setting unit 412 sets the obtained moving speed as the initial speed of the second virtual camera 201B. In step S1010, the operation UI unit 470 switches the position/orientation of the first virtual camera 201A to the position/orientation of the second virtual camera 201B. The processing in this step is the same as that in step S911.

If NO is determined in step S1005, the operation UI unit 470 switches, in step S1011, the position/orientation of the first virtual camera 201A to the position/orientation of the second virtual camera 201B. The processing in this step is the same as that in step S911. Subsequently, in step S1012, the virtual camera operation unit 401 disables the operation of the operator for the second virtual camera 201B. If NO is determined in step S1005, a target seen from the first virtual camera 201A may be largely different from that seen from the second virtual camera 201B. Therefore, to prevent an unintended operation caused by the confusion of the operator, the virtual camera operation unit 401 disables the operation of the operator in step S1012. In step S1013, when the predetermined condition is satisfied, the virtual camera operation unit 401 returns the operation of the operator for the second virtual camera 201B to the enabled state.

FIGS. 11A to 11C are views for explaining a practical example of the switching operation of the virtual camera 201. FIG. 11A is a view for explaining the relationship between a virtual camera 201n before switching, a virtual camera 201o after switching, and the field 202. Assume that the operator tracks (runs parallel to) an object 701n from the side to capture it by operating the virtual camera 201n. The object 701n moves in a direction from goal A to goal B in the field 202. That is, the direction of a motion 1101n of the object 701n is the negative direction of the Xw-axis (the X-axis of the world coordinate system). On the other hand, when viewed from the virtual camera coordinate system of the virtual camera 201n, the object 701n moves leftward. The operator moves the virtual camera 201n leftward in accordance with the motion 1101n of the object 701n. The direction of a motion 601n of the virtual camera 201n is the left direction. This is a motion when viewed from the virtual camera coordinate system of the virtual camera 201n. On the other hand, when viewed from the world coordinate system, the virtual camera 201n moves in the negative direction of the Xw-axis.

FIG. 11B shows an image displayed on the display (output unit 306) in the situation shown in FIG. 11A. Note that in FIG. 11B, the motion 1101n of the object 701n and the motion 601n of the virtual camera 201n are indicated by arrows for description, and are not displayed on the displayed. The operator tilts the joy stick (input unit 304) leftward to move the virtual camera 201n leftward. To capture the object 701n from the opposite side, the operator operates the information processing apparatus 105 to switch the virtual camera 201n to the virtual camera 201o on the opposite side with respect to the object 701n. For example, the operator selects "reversal" of the virtual camera switching button 502 in FIG. 5A, which is displayed on the display (output unit 306), thereby switching the virtual viewpoint from the virtual camera 201n to the virtual camera 201o.

FIG. 11C shows an image displayed on the display (output unit 306) after switching to the virtual camera 201o. When viewed from the virtual camera 201o after switching, the direction of the motion 1101n of the object 701n is the right direction which is opposite to the direction before switching. In this state, the operator keeps the joy stick (input unit 304) tilted leftward. Since, however, the virtual camera operation unit 401 has disabled the operation of the operator, the virtual camera 201o after switching never moves leftward. On the other hand, the initial speed setting unit 412 sets a motion 601o of the virtual camera 201o after switching to be equivalent (maintained) to the motion 601n of the virtual camera 201n before switching when viewed from the world coordinate system. The direction of this motion is the right direction when viewed from the virtual camera coordinate system of the virtual camera 201o after switching. As shown in FIG. 11C, the virtual camera 201o moves in a direction opposite to that of the operation of the operator. This causes the virtual cameras 201 before and after switching to move in cooperation with each other, thereby making it possible to continuously, smoothly capture the object 701n. The feedback output unit 405 can also display information 1102 indicating an automatic operation on the display (output unit 306). After that, for example, if the operator returns the bar of the joy stick to the neutral position, the automatic operation is canceled, and the operation of the operator is enabled again.

Figure 12A:
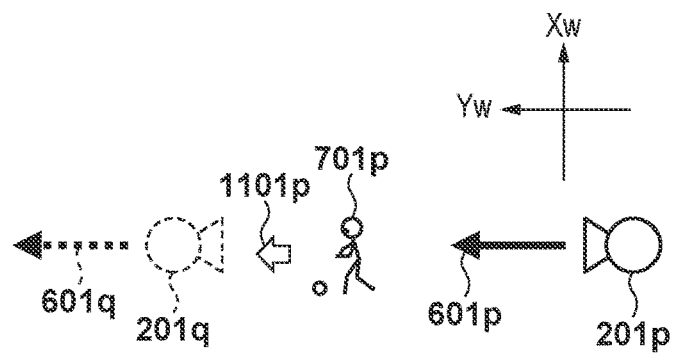
FIGS. 12A to 12C are views for explaining the cooperative motion of the virtual camera 201 before and after switching.
Figure 12B:
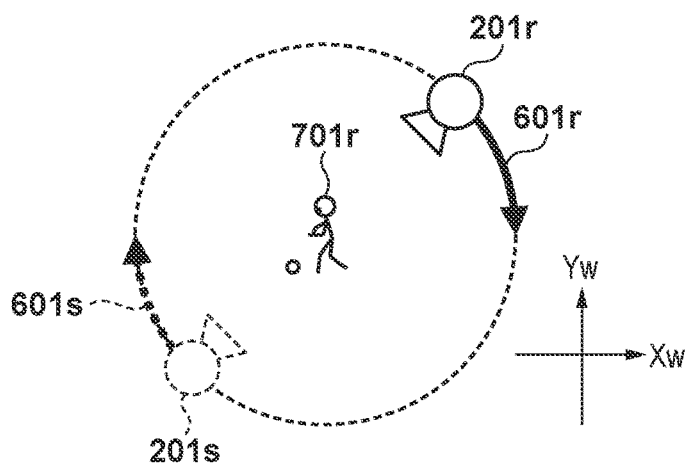
Figure 12C:
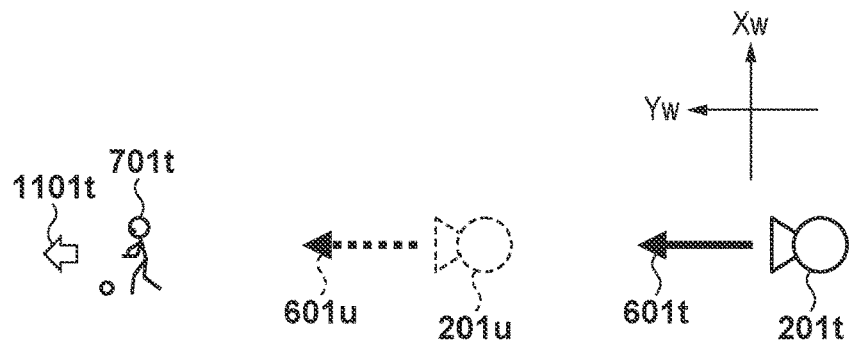

FIGS. 12A to 12C are views for explaining the cooperative motion of the virtual camera 201 before and after switching. FIG. 12A shows a scene in which the operator tracks an object 701p from the behind to capture it by operating a virtual camera 201p. The direction of a motion 1101p of the object 701p is the positive direction of the Yw-axis when viewed from the world coordinate system. On the other hand, when viewed from the virtual camera coordinate system of the virtual camera 201p, the object 701p moves forward (in a direction away from the virtual camera 201p). The operator moves the virtual camera 201p forward in accordance with the motion of the object 701p. The operator switches the virtual camera 201p to a virtual camera 201q on the opposite side to capture the object 701p from the opposite side. A motion 601q of the virtual camera 201q immediately after switching is set to be equivalent to the motion of the virtual camera 201p immediately before switching when viewed from the world coordinate system. Since the camera work in this case is a linear movement, the speed (moving direction and speed) of the virtual camera 201q is set to be equal to that of the virtual camera 201p. That is, the direction of the motion is the positive direction of the Yw-axis when viewed from the world coordinate system. This direction is the rear direction when viewed from the coordinate system of the virtual camera 201q. That is, the virtual camera 201q can capture the object 701p approaching to itself while moving backward. Note that the switching operation shown in FIG. 12A is on a path when YES is determined in step S903 of FIG. 9.

FIG. 12B shows a scene in which the operator goes around an object 701r in the clockwise direction to capture it by operating a virtual camera 201r. In this case, the operator switches the virtual camera 201r to a virtual camera 201s on the opposite side to capture the object 701r from the opposite side. Since the camera work in this case is a go-around movement, the rotation center and angular velocity (rotation direction and speed) of the virtual camera 201s are set to be equal to those of the virtual camera 201r. That is, the virtual camera 201s after switching can also go around the object in the clockwise direction to capture it. Note that the switching operation shown in FIG. 12B is on a path when NO is determined in step S903 and YES is determined in step S906 in FIG. 9.

FIG. 12C shows a scene in which the operator tracks an object 701t from the behind to capture it by operating a virtual camera 201t. The relationship between the virtual camera 201t and the object 701t is the same as that shown in FIG. 12A. In this case, to capture the object 701t closer, the operator switches the virtual camera 201t to a virtual camera 201u which precedes it by a short distance and faces in the same direction. Since the camera work in this case is a linear movement, the speed (moving direction and speed) of the virtual camera 201u is set to be equal to that of the virtual camera 201t when viewed from the world coordinate system. That is, even after the object 701t becomes closer, a cooperative smooth camera work before and after switching is possible. Note that the switching operation shown in FIG. 12C is on a path when YES is determined in step S1003, YES is determined in step S1005, and YES is determined in step S1007 in FIG. 10. Since the direction of the virtual camera 201 remains the same before and after switching, the user operation is not disabled.

As described above, according to the above-described embodiment, even if the virtual viewpoint is changed, it is possible to obtain an appropriate virtual-viewpoint image by switching the position/orientation of the virtual camera. Especially, when an object is a moving object, even if the virtual camera is switched to that at a position on the opposite side with respect to the object so that the virtual camera faces the object, the virtual camera (virtual viewpoint) is appropriately controlled, thereby obtaining an effect that the problem in which the object disappears from a virtual-viewpoint image is difficult to arise. That is, it is possible to readily implement a smooth camera work before and after switching the virtual camera. Therefore, it is possible to smoothly switch the virtual viewpoint based on a user operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237090, filed Dec. 6, 2016, which is hereby incorporated by reference herein in its entirety.

What is claimed is:

1. An information processing apparatus comprising:
one or more hardware processors; and
one or more memories which store instructions executable by the one or more hardware processors to cause the information processing apparatus to perform at least:
receiving operation information according to operation for continuously moving at least one of a position and orientation of a virtual viewpoint corresponding to a virtual-viewpoint image;
changing the position of the virtual viewpoint to a position spatially separated from a previous position of the virtual viewpoint; and
controlling a movement of the virtual viewpoint after the changing of the position, based on a previous movement of the virtual viewpoint according to the operation information received before the changing of the position.

2. The apparatus according to claim 1, wherein a moving direction of the virtual viewpoint after the changing of the position is controlled based on a previous moving direction of the virtual viewpoint according to the operation information received before the changing of the position.

3. The apparatus according to claim 2, wherein
if an angle formed by a direction from the virtual viewpoint to an object before the changing and a direction from the virtual viewpoint to the object after the changing is not smaller than a predetermined value, the moving direction of the virtual viewpoint after the changing is controlled to a direction opposite to the previous moving direction of the virtual viewpoint, and
if the angle formed by the direction from the virtual viewpoint to the object before the changing and the direction from the virtual viewpoint to the object after the changing is smaller than the predetermined value, the moving direction of the virtual viewpoint after the changing is controlled to the same direction as the previous moving direction of the virtual viewpoint.

4. The apparatus according to claim 2, wherein if a position/orientation of the other virtual viewpoint before the changing is opposite to the position/orientation of the virtual viewpoint after the changing with respect to a predetermined target, the moving direction of the virtual viewpoint after the changing is controlled to a direction opposite to the previous moving direction of the virtual viewpoint, and
if the position/orientation of the other virtual viewpoint before the changing is not opposite to the position/orientation of the virtual viewpoint after the changing with respect to the predetermined target, the moving direction of the other virtual viewpoint after the changing is controlled to the same direction as the previous moving direction of the virtual viewpoint.

5. The apparatus according to claim 4, wherein the predetermined target is an object.

6. The apparatus according to claim 3, wherein the instruction further cause the apparatus to perform:
temporarily disable moving operation by an operation device for continuously moving the virtual viewpoint, if the moving direction of the virtual viewpoint after the changing is controlled to the direction opposite to the previous moving direction of the virtual viewpoint.

7. The apparatus according to claim 6, wherein the moving operation by the operation device is temporarily disabled, the moving operation by the operation device is enabled when a predetermined condition is satisfied.

8. The apparatus according to claim 7, wherein the predetermined condition is that a predetermined operation by the operation device is performed or that a predetermined time elapses.

9. The apparatus according to claim 1, wherein
an initial speed of the virtual viewpoint after the changing of the position is controlled based on a previous moving direction and a previous moving speed of the virtual viewpoint according to the operation information received before the changing of the position.

10. The apparatus according to claim 9, wherein if the previous moving direction of the virtual viewpoint is one of a linear direction and a direction in which a predetermined circumferential movement is performed, the previous moving speed of the virtual viewpoint is set as the initial speed of the virtual viewpoint after the changing.

11. A control method for an information processing apparatus, comprising:
receiving operation information according to operation for continuously moving at least one of a position and an orientation of a virtual viewpoint corresponding to a virtual-viewpoint image;
changing the position of the virtual viewpoint to a position spatially separated from a previous position of the virtual viewpoint; and
controlling a movement of the virtual viewpoint after the changing of the position, based on a previous movement of the virtual viewpoint according to the operation information received before the changing of the position.

12. A non-transitory computer-readable storage medium storing a computer program for causing a computer to execute a control method for an information processing apparatus, the method comprising:
receiving operation information according to operation for continuously moving at least one of a position and orientation of a virtual viewpoint corresponding to a virtual-viewpoint image;
changing the position the virtual viewpoint to a position spatially separated from a previous position of the virtual viewpoint; and
controlling a movement of the virtual viewpoint after the changing of the position, based on a previous movement of the virtual viewpoint according to the operation information received before the changing of the position.

\* \* \* \* \*